July 22, 1958     J. A. RINELLA     2,843,896
APPARATUS FOR CASTING TIRE MOLD SEGMENTS
Filed June 29, 1954     3 Sheets-Sheet 1
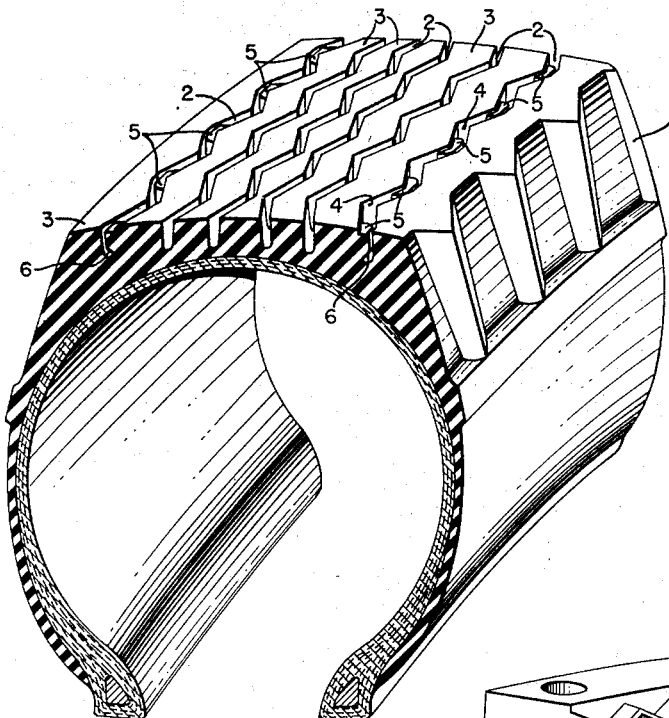
FIG. 1
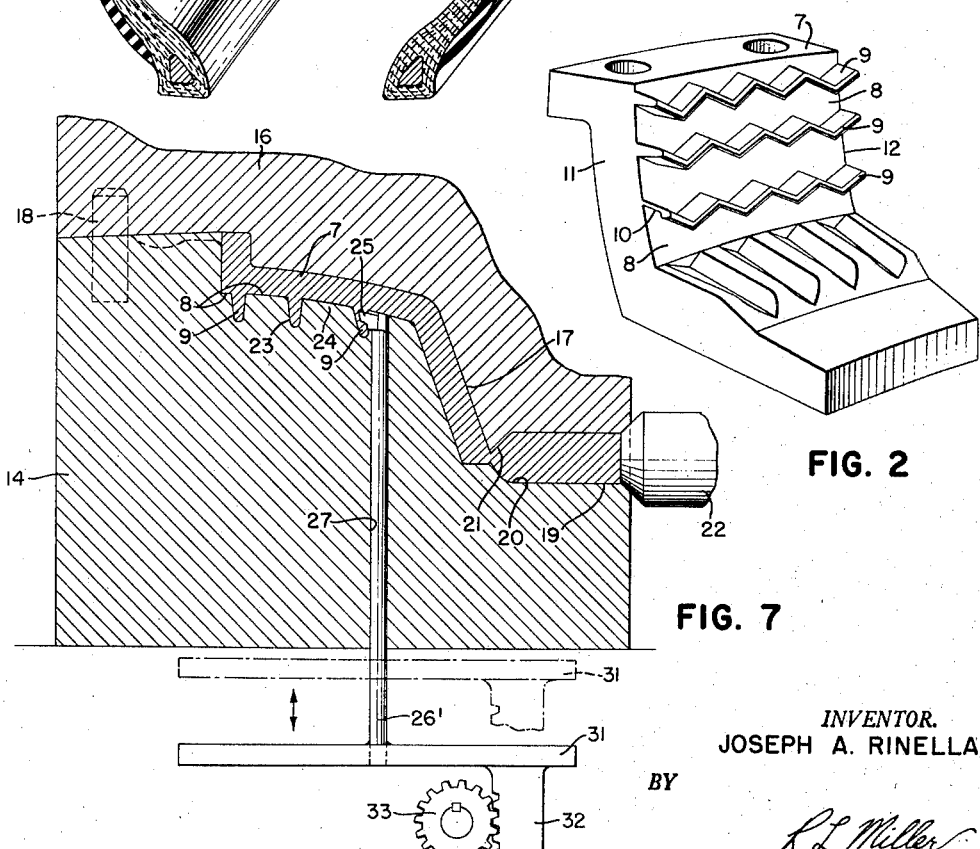
FIG. 2
FIG. 7
INVENTOR.
JOSEPH A. RINELLA
BY
R. L. Miller
ATTORNEY July 22, 1958  J. A. RINELLA  2,843,896
APPARATUS FOR CASTING TIRE MOLD SEGMENTS
Filed June 29, 1954  3 Sheets-Sheet 2

INVENTOR.
JOSEPH A. RINELLA
BY
R. L. Miller
ATTORNEY

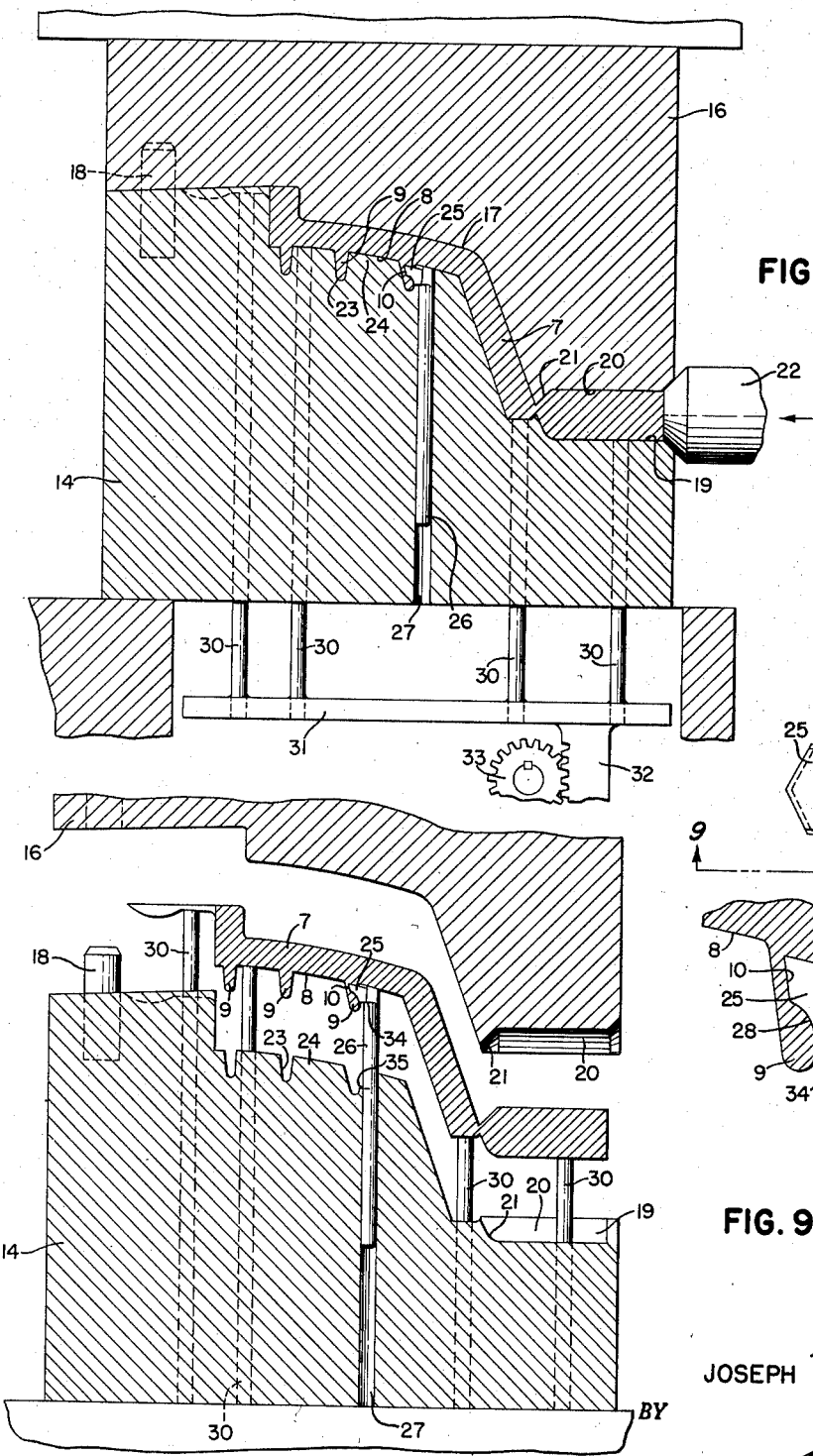

United States Patent Office 2,843,896
Patented July 22, 1958

2,843,896

APPARATUS FOR CASTING TIRE MOLD SEGMENTS

Joseph A. Rinella, Akron, Ohio, assignor to The Goodyear Tire & Rubber Company, Akron, Ohio, a corporation of Ohio Application June 29, 1954, Serial No. 440,130

5 Claims. (Cl. 22—94)

This invention relates to apparatus for casting tire mold segments and it refers more particularly to apparatus for casting tire mold segments having undercut rib portions.

Many tire tread designs are provided with undercut projections extending into grooves and spaced apart on the sidewalls of the ribs. It has been the prior practice to cast these projections by means of the "lost wax" process disclosed in U. S. Patent 2,263,001 or to cast the mold segments and thereafter cut the undercut portion into the sidewall of the ribs. The lost wax process involves many detailed steps and is, therefore, very costly. By first casting the inserts and thereafter machining the undercut portion by grinding, cutting or rasping, the special equipment involved and their incident operations represent substantial production costs.

An object of this invention is to provide a die for casting tread mold segments having means for directly molding undercut portions into the ribs of the segment.

A further object of this invention is to provide an apparatus for casting tread-forming segments with undercut rib portions formed by a movable die projection which is carried out of the die body with the cast segment for removal therefrom.

These and other objects and advantages will be apparent from the following description of the drawings, in which:

Fig. 1 is a perspective fragmentary view of a tire tread constructed in accordance with this invention.

Fig. 2 is a perspective view of a segmental tread-forming mold casting.

Fig. 4 is a sectional view taken along the lines 4—4 of Fig. 3 showing the die cover in closed position.

Fig. 5 is a sectional view similar to Fig. 4 showing the die in open position and the casting in ejected position.

Fig. 7 is a cross-sectional view similar to Fig. 4 showing a modification of the present invention.

Fig. 8 is a plan view of the movable die projection.

Fig. 9 is an enlarged cross-sectional view with parts broken away taken along the lines 9—9 of Fig. 8.

Figure 6:
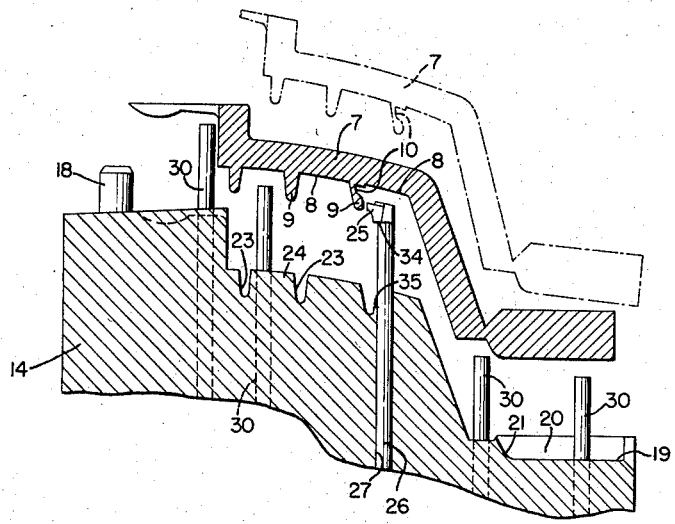
Fig. 6 is a cross-sectional view similar to Fig. 5 showing the casting disengaged from the ejector pins.

In the drawings the tire illustrated in Fig. 1 and generally designated by the numeral 1 is provided with a tread having a plurality of recesses or grooves 2 forming intervening ribs 3. The sidewalls 4 of the ribs 3 are provided with projections 5 which extend into the grooves 2 for the purpose of preventing the sidewalls 4 of the ribs 3 from engaging each other when the tread is subject to lateral stress. The projection 5 has a longitudinal dimension less than the depth of the grooves and is provided with a shoulder 6 which forms a groove contour undercutting the projection.

In Fig. 2 a segmental tread-forming mold casting is designated generally by the numeral 7 and has a configuration which is negative or reverse with respect to the tread design shown in Fig. 1. The depressions 8 correspond to the ribs 3 of the tire 1 and the ribs 9 of the casting correspond to the grooves 2 of the tire 1. Each of the ribs 9 of the casting 7 are provided with undercut portions 10 to form the corresponding projections 5 of the tire tread. The tread-forming casting 7 comprises a single segment of the tire mold in which the tire is vulcanized. In accordance with usual practice, a plurality of segments 7 are secured in a vulcanizing mold shell after the lateral edges 11 and 12 have been machined to form one of two annular mating tire mold halves.

Figure 3:
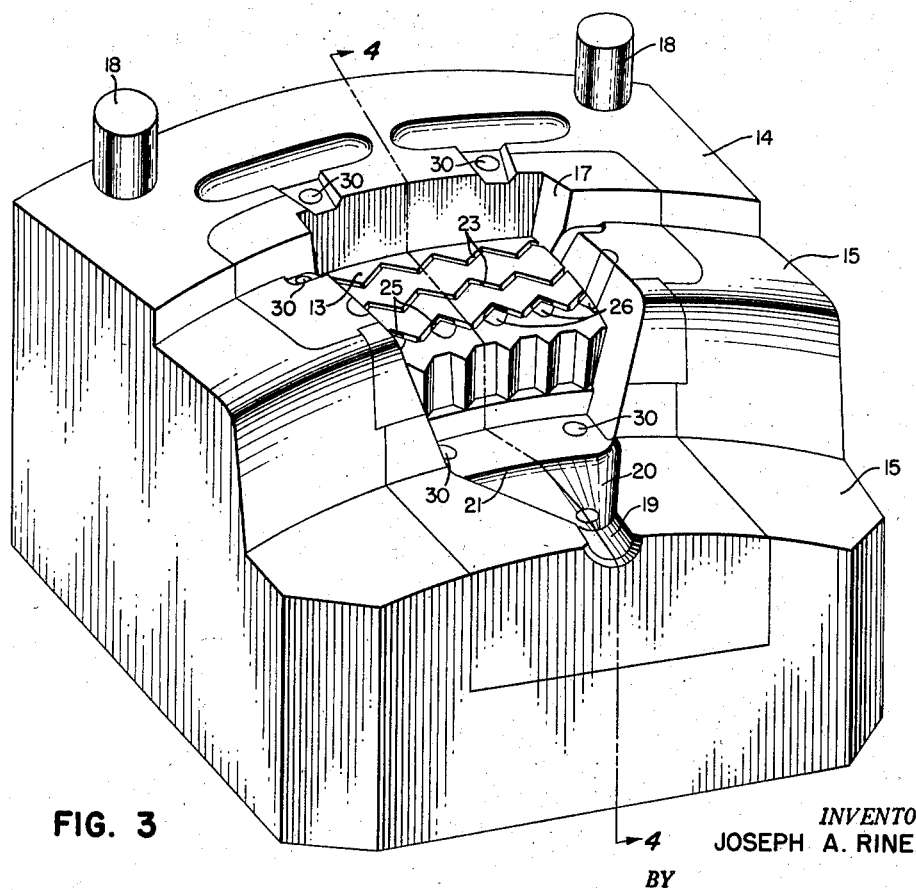
Fig. 3 is a perspective view of a die body for molding a segmental tread-forming mold casting.

The casting 7 with the undercut portion 10 may be die cast by the novel molding apparatus which will now be described. Referring to Fig. 3 of the drawings a die 13 having a positive pattern of the tire 1, or otherwise stated, a negative pattern of the casting 7, engraved or embossed in the surface thereof is mounted in the die body 14 having arcuate surfaces 15—15 which form the parting faces between the die body 14 and the die cover 16. With the die cover in closed position, the die 13 is displaced some distance from the parting surfaces of the mold body 14 and the die cover 16 to form a mold cavity 17. The engraved surface of the die 13 forms one sidewall of the cavity 17. The die cover is centered relative to the die body by pins 18—18. The lower surface 15 of the die body and the die cover 16 are suitably channelled to form a gate 19 outwardly flared into a neck portion 20 which terminates into a throat 21 of reduced width as shown in Figs. 4 and 5. Molten metal is injected into the mold cavity 17 by means of an injection nozzle 22.

The die 13 is provided with grooves 23 and ribs 24 corresponding respectively to the ribs 9 and grooves 8 of the casting 7. Similarly, the die 13 is provided with projections 25 for forming the undercut portion 10 of the casting 7. The projection 25 is formed integrally with a pin 26 which is axially movable within the bore 27 drilled adjacent the sidewall of rib 24. The projection 25, as shown in Fig. 9, is undercut at portion 28 so as to form a surface coextensive with the sidewall of the groove 23. The upper end of pin 26 terminates flush with the surface of the rib 24 and is provided with diverging lateral flanges 29—29 as shown in Fig. 8. The upper portion of rib 24 adjacent bore 27 is machined similarly to the diverging flanges 29—29 so that the projection 25 is prevented from rotating relative to the axis of bore 27. Furthermore, the diverging flanges 29—29 present a greater area of contact with the die body for supporting the pin 26 and projection 25.

After molten metal has been injected into the cavity 17 through the nozzle 22, the casting 7 is allowed to solidify and is then ejected from the mold cavity 17 after the die cover 16 has been moved into the position shown in Fig. 5. A plurality of ejector pins 30 are provided to knock the casting from the intricate design of the die and carry it into the position shown in Fig. 5. The pins 30 extend through the die body 14 at points immediately adjacent but outside of the area of the die 13 and are connected to an ejector plate 31 which is actuated by a rack 32 attached thereto and driven by an oscillating pinion 33.

After the casting 7 has been carried by the ejector pins into the position shown in Fig. 5, it is seen that the projections 25 of the pins 26 remain engaged with the recess 10 of the casting 7. Referring to Fig. 6 of the drawings, casting 7 is moved laterally with respect to the projections 25 so as to disengage the recess 10 from the projections 25. Thereafter, the pins 26 will fall by gravity into the holes 27 until the base 34 of the projections contacts the shoulder 35 of the rib 24. The upper surface of the pins 26 is then disposed in a plane coextensive with the plane of the rib 24. The diverging flanges 29—29 of the pins 26 center the projection 25 relative to the groove 23 and lock the pin against rotary movement.

Referring to Fig. 7 of the drawings, a modified form of the present invention is shown in which the pins 26' provided with the projections 25 function as ejector pins for removing the casting 7 from the die 13. The pins 26' are attached to plate 31. The actuating mechanism for the ejector plate 31 consists of a rack 32 and a driving gear 33 which is adapted to move the plate 31 into the upper position shown in Fig. 7 and hold the plate in the upper position until the casting 7 is removed from the pins in a manner similar to that described above.

Although this invention has been illustrated by a specific tread design having projections of a specific configuration extending into grooves, it is to be understood that the invention is not limited to any particular tire tread design or to the configuration of the projection shown and described so long as the projection extends from the sidewall of a groove or recess in the tread design at spaced apart positions and are undercut. Furthermore, it is to be understood that the projections may extend from the sidewalls of more than one of the grooves or recesses.

While certain representative embodiments and details have been shown for the purpose of illustrating the invention, it will be apparent to those skilled in this art that various changes and modifications may be made therein without departing from the spirit or scope of the invention.

I claim:

1. A die for molding a tire mold segment having a negative pattern of a tire tread design including spaced undercut rib portions, said die comprising in combination a die cover and a die body separable on a parting face and having surfaces defining a mold cavity; said die body surface having a positive pattern of a segment of a tire tread design including at least one groove engraved thereon, longitudinal means supported within the die body for reciprocating movement in a plane laterally displaced from the sidewalls of said groove, a projection extending from said means and into said groove from the sidewall thereof, said projection defining a restriction with the opposite wall of the groove, said restriction connecting the bottom of the groove with the mold cavity and means for ejecting the casting in a direction parallel to the axis of said longitudinal means whereby the molded segment insert carries said projection above the surface of the die body and an undercut is formed on the casting extending laterally into the rib thereof formed by said mold groove.

2. A die for molding a tire mold segment as claimed in claim 1 in which means are provided for preventing rotary movement of the longitudinal means.

3. A die for molding a tire mold segment as claimed in claim 1 in which the upper end of said longitudinal means terminates flush with the surface of the mold cavity and the opopsite end of said longitudinal means extends inwardly into the mold body for a distance substantially greater than the depth of said grooves.

4. A die for molding a tire mold segment as claimed in claim 1 in which the longitudinal means is connected to and operable with an ejector plate.

5. A die for molding a tire mold segment having a negative pattern of a tread design including spaced undercut rib portions said die comprising in combination, a die cover and a die body separable on a parting face and having surfaces defining a mold cavity, said die body having a positive pattern of a segment of a tire tread engraved therein including grooves forming intervening ribs, a plurality of slidable pins in said ribs terminating flush with the cavity-defining surface of said die body, a projection extending laterally from each pin into the adjacent groove, said projection defining a restriction with the opposite wall of the groove, said restriction connecting the bottom of the groove with the mold cavity, and means for ejecting the casting from said die whereby an undercut is formed on the casting extending laterally into the rib thereof formed by said mold groove.

References Cited in the file of this patent

UNITED STATES PATENTS

| | | |
|---|---|---|
| 1,786,629 | Pepper | Dec. 30, 1930 |
| 2,263,001 | Gunsaulus | Nov. 18, 1941 |
| 2,510,716 | Portmann et al. | June 6, 1950 |
| 2,582,260 | Kutik | Jan. 15, 1952 |